United States Patent
Grisenthwaite et al.

(10) Patent No.: US 10,795,675 B2
(45) Date of Patent: Oct. 6, 2020

(54) DETERMINE WHETHER TO FUSE MOVE PREFIX INSTRUCTION AND IMMEDIATELY FOLLOWING INSTRUCTION INDEPENDENTLY OF DETECTING IDENTICAL DESTINATION REGISTERS

(71) Applicant: ARM LIMITED, Cambridge (GB)

(72) Inventors: Richard Roy Grisenthwaite, Cambridge (GB); Nigel John Stephens, Cambridge (GB)

(73) Assignee: ARM Limited, Cambridge (GB)

( * ) Notice: Subject to any disclaimer, the term of this patent is extended or adjusted under 35 U.S.C. 154(b) by 83 days.

(21) Appl. No.: 15/761,476

(22) PCT Filed: Sep. 14, 2016

(86) PCT No.: PCT/GB2016/052838
§ 371 (c)(1),
(2) Date: Mar. 20, 2018

(87) PCT Pub. No.: WO2017/064456
PCT Pub. Date: Apr. 20, 2017

(65) Prior Publication Data
US 2018/0267798 A1    Sep. 20, 2018

(30) Foreign Application Priority Data
Oct. 14, 2015    (GB) .................................. 1518156.3

(51) Int. Cl.
*G06F 9/30*    (2018.01)
*G06F 9/38*    (2018.01)

(52) U.S. Cl.
CPC ........ *G06F 9/30032* (2013.01); *G06F 9/3016* (2013.01); *G06F 9/3017* (2013.01);
(Continued)

(58) Field of Classification Search
CPC ............... G06F 9/30032; G06F 9/3836; G06F 9/30181; G06F 9/3016; G06F 9/30123;
(Continued)

(56) References Cited

U.S. PATENT DOCUMENTS 5,303,358 A * 4/1994 Baum ................... G06F 9/3001
712/226
2002/0116599 A1    8/2002 Kainaga et al.
(Continued)

OTHER PUBLICATIONS

Intel 64 and IA-32 Architectures Software Developer's Manual vol. 2A: Instruction Set Reference, A-M (excerpted pages). Datasheet [online]. Intel Corporation, Dec. 2009 [retrieved on Mar. 4, 2019]. Retrieved from the Internet: <URL: https://www.naic.edu/~phil/software/intel/253666.pdf>.*
(Continued)

*Primary Examiner* — Aimee Li
*Assistant Examiner* — Shawn Doman
(74) *Attorney, Agent, or Firm* — Nixon & Vanderhye P.C.

(57) ABSTRACT

An apparatus 2 has instruction fusing circuitry 50 for fusing two or more instructions fetched from a data store to generate a fused instruction to be processed by processing circuitry 14. A move prefix instruction is provided which indicates to the instruction fusing circuitry 50 that the move prefix instruction can be fused with an immediately following data processing instruction without needing to compare registers specified by the move prefix instruction and the immediately following instruction. This enables the instruction fusing circuitry 50 to be implemented with reduced hardware and energy cost.

29 Claims, 6 Drawing Sheets

(52) U.S. Cl.
CPC ...... *G06F 9/30072* (2013.01); *G06F 9/30123* (2013.01); *G06F 9/30181* (2013.01); *G06F 9/3836* (2013.01); *G06F 9/3853* (2013.01)

(58) Field of Classification Search
CPC ... G06F 9/30072; G06F 9/3853; G06F 9/3017
USPC ....................................................... 712/226
See application file for complete search history.

(56) References Cited

U.S. PATENT DOCUMENTS

| | | | | |
|---|---|---|---|---|
| 2011/0264891 | A1* | 10/2011 | Parks | G06F 9/30145 712/200 |
| 2013/0086362 | A1 | 4/2013 | Gschwind et al. | |
| 2013/0311754 | A1 | 11/2013 | Brown et al. | |
| 2014/0149722 | A1 | 5/2014 | Brown et al. | |
| 2014/0164741 | A1* | 6/2014 | Gschwind | G06F 9/30029 712/205 |
| 2014/0181464 | A1* | 6/2014 | Forsyth | G06F 9/30018 711/214 |
| 2014/0208073 | A1* | 7/2014 | Blasco-Allue | G06F 9/30058 712/205 |
| 2015/0347144 | A1* | 12/2015 | Whittaker | G06F 9/30149 712/208 |
| 2017/0090922 | A1* | 3/2017 | Tu | G06F 9/3016 |
| 2017/0090939 | A1* | 3/2017 | Gschwind | G06F 9/30167 |

OTHER PUBLICATIONS

International Search Report and Written Opinion of the ISA for PCT/GB2016/052838, dated Dec. 8, 2016, 11 pages.
Combined Search and Examination Report for GB1518156.3, dated Apr. 15, 2016, 6 pages.
Hu et al., "Using Dynamic Binary Translation to Fuse Dependent Instructions", Proceedings of the International Optimization Symposium on Code Generation and Optimization (CGO '04), Mar. 20-24, 2004, 12 pages.
Examination Report for GB Application No. 1518156.3 dated Apr. 27, 2020, 4 pages.

* cited by examiner

DETERMINE WHETHER TO FUSE MOVE PREFIX INSTRUCTION AND IMMEDIATELY FOLLOWING INSTRUCTION INDEPENDENTLY OF DETECTING IDENTICAL DESTINATION REGISTERS

This application is the U.S. national phase of International Application No. PCT/GB2016/052838 filed 14 Sep. 2016, which designated the U.S. and claims priority to GB Patent Application No. 1518156.3 filed 14 Oct. 2015, the entire contents of each of which are hereby incorporated by reference.

The present technique relates to the field of data processing.

Sometimes processing circuitry may support in hardware an operation which does not have a direct equivalent in an encoded instruction of the instruction set architecture which the processing circuitry is designed to execute. For example, limited encoding space available in the instruction set architecture may mean that a given operation may require two or more separate instructions to be defined in the program being executed, but the processing apparatus may have the instruction fusing circuitry which may detect that there is a group of two or more instructions which are equivalent to a single fused instruction supported by the processing circuitry, and if so supply the fused instruction to the processing circuitry for execution. However, such instruction fusing circuitry to detect when there are sets of instructions which can be fused can be relatively expensive in terms of circuit area and power consumption. For many low end systems for which energy efficiency may be more important than performance, the overhead of instruction fusion may be too high and so the benefits of instruction fusion are often not available for such systems.

At least some examples provide an apparatus comprising:
processing circuitry to perform data processing in response to instructions; and
instruction fusing circuitry to fuse a move prefix instruction and an immediately following instruction fetched from a data store to generate a fused data processing instruction to be processed by the processing circuitry;
wherein the move prefix instruction identifies a move destination register and a move source register specifying a data value to be at least partially copied to the move destination register; and
in response to detecting said move prefix instruction, the instruction fusing circuitry is configured to determine whether to fuse said move prefix instruction and said immediately following instruction independently of whether the move destination register of the move prefix instruction is the same register as any register specified by said immediately following instruction.

At least some examples provide a data processing method comprising:
detecting, among instructions fetched from a data store for processing by processing circuitry, a move prefix instruction identifying a move destination register and a move source register specifying a data value to be at least partially copied to the move destination register; and
determining whether to fuse the move prefix instruction with an immediately following instruction to generate a fused data processing instruction to be processed by the processing circuitry;
wherein when the move prefix instruction is detected, the determining step determines whether to fuse said move prefix instruction and said immediately following instruction independently of whether the move destination register of the move prefix instruction is the same register as any register specified by said immediately following instruction.

At least some examples provide an apparatus comprising:
means for performing data processing in response to instructions; and
means for fusing a move prefix instruction and an immediately following instruction fetched from a data store to generate a fused data processing instruction to be processed by the processing circuitry;
wherein the move prefix instruction identifies a move destination register and a move source register specifying a data value to be at least partially copied to the move destination register; and
in response to detecting said move prefix instruction, the means for fusing is configured to determine whether to fuse said move prefix instruction and said immediately following instruction independently of whether the move destination register of the move prefix instruction is the same register as any register specified by said immediately following instruction.

At least some examples may also provide a computer program stored on a computer readable storage medium that, when executed by a data processing apparatus, provides a virtual machine which provides an instruction execution environment corresponding to the apparatus described above. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus having instruction fusing circuitry;

Figure 1:
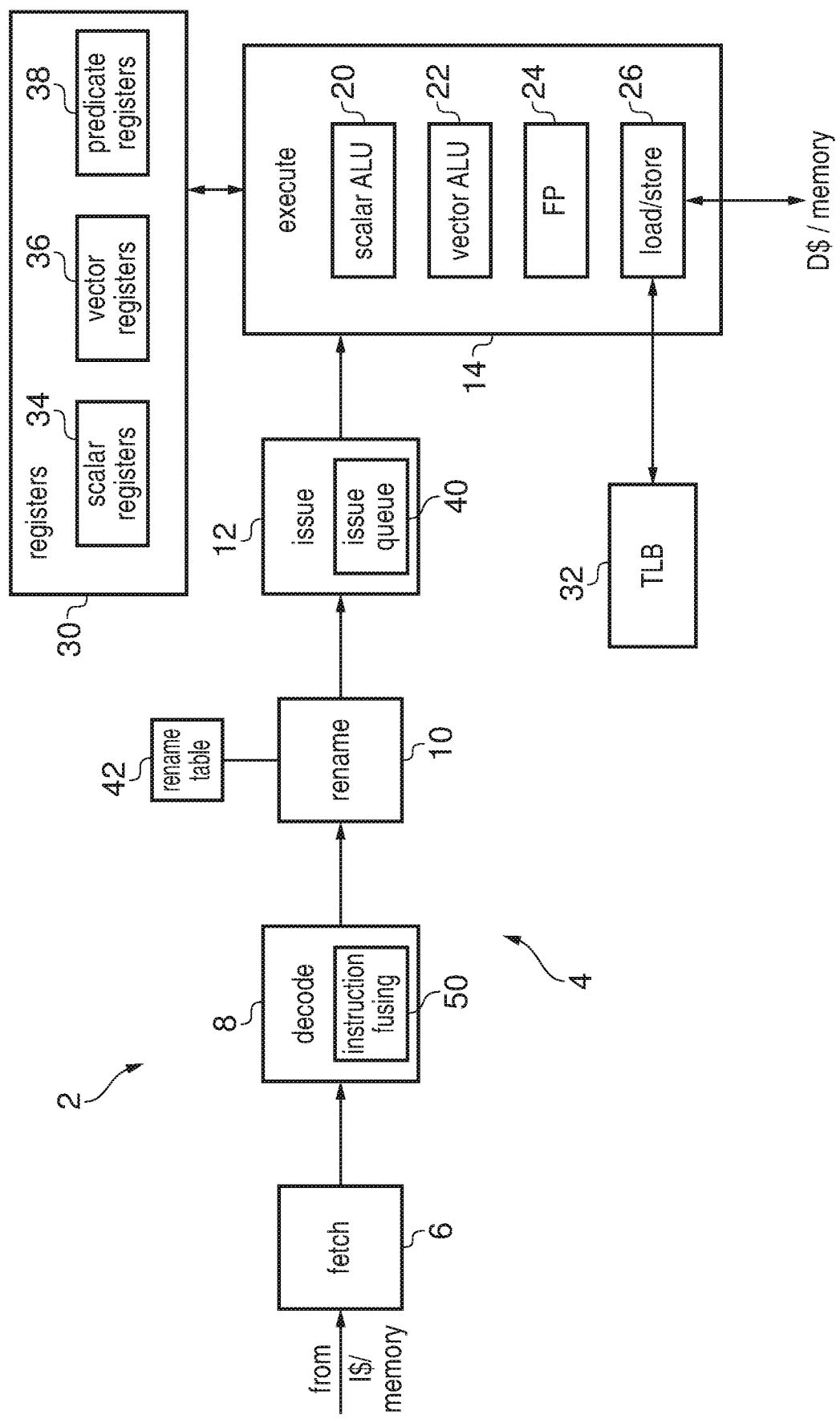

Specific examples of the present technique will be set out below. It will be appreciated that the present technique is not limited to these examples.

A move prefix instruction is provided that can be placed before an immediately following instruction to signal to instruction fusing circuitry that it is safe to fuse the move prefix instruction and the immediately following instruction without needing to check whether a destination of the move prefix instruction is the same as any register specified by the immediately following instruction. This avoids the instruction fusing circuitry needing to have comparators for comparing the registers of the respective instructions, making instruction fusion cheaper to implement in hardware and hence making instruction fusion available to lower end systems for which instruction fusion may previously have been too expensive in terms of hardware and energy consumption.

Data processing instructions may be defined as either constructive instructions or destructive instructions. A constructive instruction has an encoding with space for separate register specifiers separately identifying the destination register and the source registers of the data processing instruction. On the other hand, for a destructive instruction the encoding may have a single register specifier which identifies both the destination register and one of the source registers. An example of a constructive instruction may be the add instruction ADD Rd, Rs1, Rs2 which may trigger processing circuitry to perform the operation Rd=Rs1+Rs2. An example of a destructive operation may be the add instruction ADD Rd, Rs1 which triggers the processing circuitry to perform the add operation Rd=Rd+Rs1.

The constructive form of the instruction can be useful because it maintains the previous values of all of the input operands and so if multiple instructions require the same input then they can continue to refer to the same source register as the previous constructive instruction. For example, in the constructive add operation discussed above, if register Rs1 is needed again for another instruction then using the constructive form allows this value to be preserved without requiring any further instructions to manipulate the registers before performing the add.

However, in some instruction set architectures, encoding space is at a premium and there may not be enough space to accommodate a separate register specifier for the destination register in addition to register specifiers for each of the source operands. Therefore, some instruction set architectures do not provide a constructive encoding for some instructions, and so a destructive encoding may be the only one available for a programmer or a compiler. Destructive encodings save encoding space since by writing the result of the destructive instruction to one of the source registers, fewer register specifiers need to encoded in the instruction. Nevertheless, it is common for a programmer or a compiler to want to use constructive forms of an instruction if the data flow analysis indicates that all of the instructions input remain live (are read again) after the instruction completes. If a constructive instruction for carrying out a desired operation is not available in the instruction set architecture, then a programmer or a compiler can work around this by inserting a register move or copy instruction somewhere prior to the destructive instruction.

For example, the following vector operation may not have a constructive instruction available in the architecture:

$$rd=pg?rs1+rs2:0; //\text{corresponding to ADD } Zd.S, Pg/Z, Zs1.S, Zs2.S. \quad (1)$$

where rd is the destination register, rs1 and rs2 are the source registers, and pg is a predicate value which identifies which elements of the vector registers are active or inactive elements, with active elements being set to the sum rs1+rs2 of the corresponding elements in the source registers, and inactive elements of rd being set to 0.

If the constructive ADD instruction shown above is not available, then the programmer or compiler may instead use separate move and destructive add instructions:

$$rd=pg?rs1:0; //\text{corresponding to MOV } Zd.S, Pg/Z, Zs1.S \quad (2)$$

$$rd=pg?rd'+rs2:rd; //\text{corresponding to ADD } Zd.S, Pg/M, Zs2.S$$

(in the vector instruction syntax shown above, the suffix /Z or /M for the predicate indicates whether zeroing or merging prediction is used. For zeroing predication, the inactive elements of the result are set to zero, while for merging predication, the inactive elements keep the same value which was previously stored in the corresponding elements of the destination register Zd.S).

Hence, using the two instructions of example (2), the contents of register Zs1.S (rs1) can be preserved so that it can be read by a subsequent instruction. However, requiring an additional instruction to be decoded and processed can reduce performance.

In practice, the hardware of the processing circuitry may still support constructive data processing operations even if the constructive instruction is not provided within the instruction set architecture. For example, a given instruction set architecture may use destructive encodings only for the instructions for which there is greatest pressure on encoding space, with other types of instruction which require fewer different values to be encoded in the instruction having enough space for the separate destination register specifier. Hence, even if there are some destructive instructions in the instruction set architecture, the fact that there are also some constructive instructions may mean that the hardware of the processing circuitry itself still has inputs for receiving separate source and destination register specifiers, and so with relatively little modification the destructive instructions could also be transformed into a constructive operation to be issued to the processing circuitry.

Hence, some implementations may provide instruction fusing circuitry to recognise when there is a sequence of a move instruction and a subsequent data processing instruction as above which are really intended to implement a corresponding constructive data processing operation, and when such a sequence is recognised the instruction fusing circuitry may fuse them to generate a single fused data processing instruction to trigger the processing circuitry to perform the constructive operation. For example, the processing circuitry may be issued with the constructive vector ADD instruction as shown in the example (1) above, instead of the separate vector MOV and ADD instructions from example (2).

However, there are a number of issues which make such instruction fusion harder. Firstly, if the pair of the move instruction and the subsequent data processing instruction cross a page boundary or a cache-line or instruction fetch boundary then the instruction fusing circuitry may not encounter the subsequent data processing instruction in the same batch of instructions as the move instruction, which can make it harder to identify the combination of instructions without maintaining some additional internal state between seeing the move instruction and seeing the subsequent data processing instruction. Maintaining such additional internal state would increase the hardware overhead of the instruction fusing circuitry.

Also, to be able to fuse the move instruction and the subsequent data processing instruction, the instruction fusing circuitry may need to check that the operands of the move and data processing instructions are compatible so that they can be fused. For example, the instruction fusing circuitry may need to check that the destination registers of the move and subsequent data processing instructions are the same, that there is no intervening instruction which overwrites that register, and if the instructions are vector instructions specifying a predicate register which identifies which data elements of the vector operand are active elements, that the predicate registers specified by the two instructions are also the same. These checks would ensure that the move instruction and the subsequent data processing instruction are really intended to implement the equivalent constructive operation and are not independent operations. Performing all these checks would greatly increase the complexity of the instruction fusing circuitry and this may not be justified for a relatively low end implementation.

Another issue with fusion is that the fused instruction could trigger an exception condition, such as when a floating point instruction encounters a floating point exception such as overflow, or underflow or divide by zero. Dealing with such exceptions can be more complicated for the fused instruction.

For all these reasons, typically instruction fusion has only been possible for move and data processing instructions in relatively high end implementations for which performance is a more significant requirement than energy efficiency. It is desirable to make the benefits of fusion available to lower end implementations as well.

To address these issues, a dedicated move prefix instruction is provided which a programmer or a compiler can use to prefix an immediately following instruction to signal that the move prefix instruction and the immediately following instruction can be fused. The move prefix instruction identifies a move destination register and a move source register specifying a data value to be at least partially copied to the move destination register. When the move prefix instruction is detected, the instruction fusing circuitry may determine whether to fuse the move prefix instruction and the immediately following instruction independently of whether the move destination register of the move prefix instruction is the same register as any register specified by the immediately following instruction.

Hence, the instruction fusing circuitry does not need to compare the registers in the move prefix instruction and the immediately following instruction, as the fact that the move prefix instruction was provided is a signal that the immediately following instruction is expected to be a destructive data processing instruction for which the destination register and the first source register are the same as the move destination register of the move prefix instruction. In summary, by giving the programmer or the compiler the responsibility to choose the move prefix instruction when the pair of the move instruction and a destructive instruction are intended to implement a constructive operation fusion, this avoids needing more complex hardware in the processing circuitry for detecting cases when fusion is possible, saving power consumption and circuit area.

FIG. 1 schematically illustrates an example of data processing apparatus 2 comprising a processing pipeline 4 including a number of pipeline stages. In this example the pipeline stages include a fetch stage 6 for fetching instructions from a data store (e.g. an instruction cache or memory), a decode stage for decoding the fetched instructions, a rename stage 10 for performing register renaming, an issue stage 12 for issuing instructions for execution, and an execute stage 14 for executing the issued instructions. The execute stage 14 includes a number of execute units for executing different kinds of instructions, for example a scalar ALU (arithmetic logic unit) 20 for executing scalar data processing instructions, a vector ALU 22 for executing vector data processing instructions, a floating point unit 24 for executing floating point instructions (in some cases separate scalar and vector floating point units could be provided), and a load/store unit 26 for executing load/store instructions for transferring data between registers 30 and a data store such as a data cache or memory. A translation look aside buffer (TLB) 32 may be provided for caching address translation data for translating virtual addresses specified by the load/store instructions to physical addresses identifying locations within the data cache or the memory.

The registers 30 include scalar registers 34 for storing scalar operands each comprising a single data element, vector registers 36 for storing vector operands each comprising multiple data elements, and predicate registers 38 for storing predicate values identifying which elements of a vector register 36 are active or inactive. In response to a vector instruction processed by the vector ALU 22, one or more vector operands may be read from the vector register 36 and a predicate value stored in one of the predicate register 38 may control the vector ALU 22 to perform a given data processing operation on any active data elements indicated by the predicate value to generate corresponding result data elements to be written back to one of the vector registers, while any elements corresponding to inactive lanes indicated by the predicate may take some other value. Different inactive lane handling modes may be defined for determining how to set the values of the inactive lanes in the destination register. For example, the inactive result data elements could be cleared to a predetermined value (e.g. zero) or could retain the previous value of the corresponding element of the destination register. On the other hand, for scalar instructions, the scalar ALU 20 or floating point unit 24 may read data values from the scalar registers 34, process them and write a result value back to one of the scalar registers 34.

In the example of FIG. 1, the pipeline 4 is an out-of-order pipeline which supports execution of instructions in a different order to the program order in which the instructions were fetched by the fetch stage 6. The issue stage 12 has an issue queue 40 for queuing instructions to be executed while waiting for their operands to become available. When an instruction's operands become available, then it may be issued for execution by the execute stage 40 even if an earlier instruction in the program order is still waiting for its operands. To increase the extent to which reordering of instructions is possible, the rename stage 10 is provided to map architectural register specifiers specified by the fetched instructions to physical register specifiers identifying physical registers 30 provided in hardware. Typically the number of physical registers provided is greater than the number of architectural registers available in the instruction set architecture, to allow different instructions specifying the same architectural register to be mapped to different physical registers so that dependencies between these instructions can be eliminated. This permits greater flexibility to reorder the execution of instructions, to improve performance. The rename stage 10 maintains a rename table 42 for tracking the mapping between architectural register specifiers and physical register specifiers.

It will be appreciated that other examples may provide an in-order pipeline for which program instructions are executed in their original program order. In this case the rename stage 10 could be omitted and the issue stage 12 may issue a given instruction when its operands are available and any earlier instructions in the program order have been issued.

It will be appreciated that this is just one example of a possible pipeline architecture and other examples may have different stages or different combinations of execute units in the execute stage 14. For example, some pipelines may have an additional dispatch stage between the decode stage 8 and the issue stage 12 so that decoded instructions may wait in the dispatch stage when the issue queue 40 is full to avoid blocking the decoding of other instructions at the decode stage 8.

The instructions fetched from the data store by the fetch circuitry 6 may be referred to as "macro-instructions", while the decoded instructions passed to the execute stage 14 for execution may be referred to as "micro-instructions" or "micro-operations". For some types of instruction, there may be a one-to-one mapping between the macro-instruction fetched from the cache or memory and the micro-operation executed by the execute stage 14. However, for other types of instruction, a complex instruction may be decoded by the decode stage 8 into multiple micro-operations which can then be issued separately for execution by the execute stage 14. For example, a load multiple instruction could be decoded into a number of individual load micro-operations each for loading data from memory into a different register.

Also, two or more macro-instructions may be fused to generate a single micro-instruction to be executed. In this example, the decode stage 8 has instruction fusing circuitry 50 for fusing various groups of two or more instructions detected within the stream of instructions fetched by the fetch stage from the instruction cache or memory, and when such a group is detected, fusing these to generate a single fused data processing instruction giving an equivalent result which can then be forwarded to subsequent stages for processing. This enables improved performance since a single instruction can typically be executed faster than two or more separate instructions. While FIG. 1 shows the decode stage 8 comprising the instruction fusing circuitry 50, in other examples the instruction fusion could take place at another stage such as a dispatch stage or the issue stage 12 (for example, the decode stage 8 could initially decode the group of instructions into separate decoded instructions, but fusing circuitry at the issue stage could then fuse these into a single micro-operation). Therefore, it is not essential for instruction fusion to take place when decoding.

The instruction fusing circuitry 50 may detect a fusible group of instructions which can be mapped to a corresponding fused instruction (fused micro-operation) to be sent to the processing circuitry 14. There may be several different fusible groups which can each be mapped to a corresponding fused instruction. However, the subsequent examples will focus on a particular group comprising a move prefix instruction and an immediately following instruction. This does not exclude the instruction fusing circuitry 50 being able to fuse other types of instructions as well.

Figure 2:
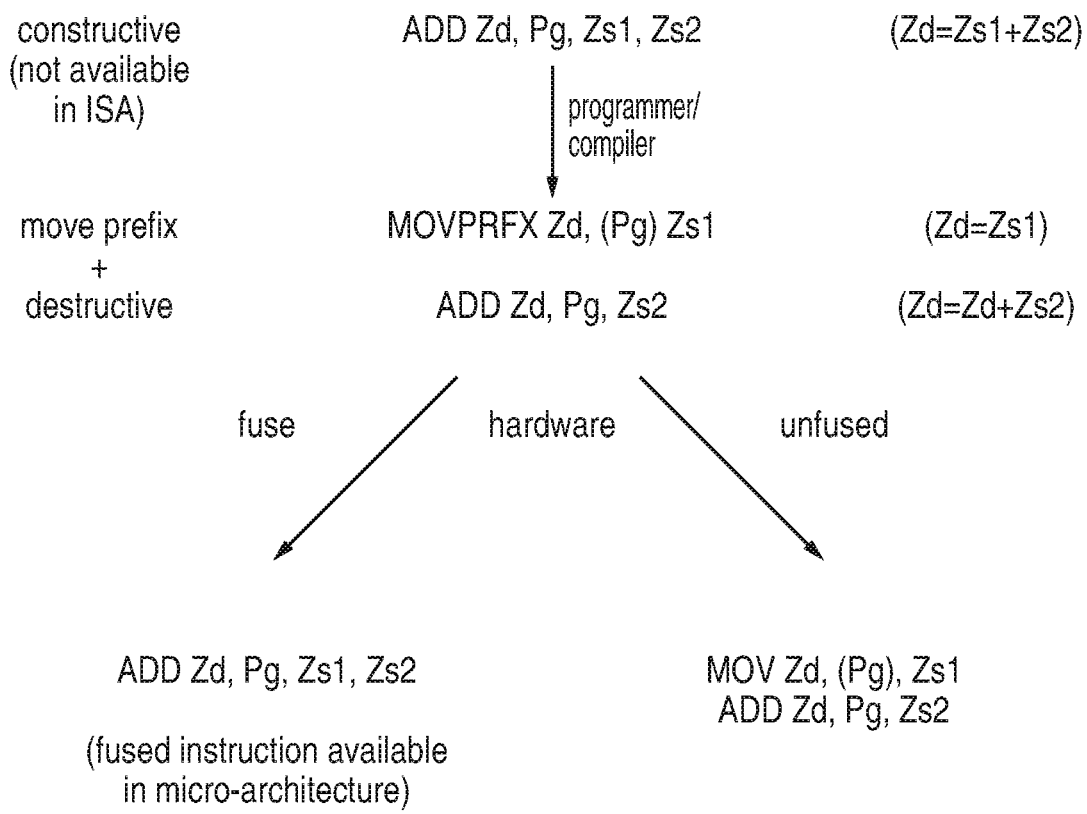
FIG. 2 illustrates use of a move prefix instruction for signalling to the instruction fusing circuitry that the move prefix instruction can be fused with an immediately following instruction.

FIG. 2 shows an example of the instruction fusion performed by the instruction fusing circuitry 50. The top part of FIG. 2 shows a constructive add instruction which the programmer or the compiler really wishes to use, but which is not available in the instruction set architecture supported by the apparatus 2. The constructive add instruction specifies a destination register Zd, a predicate register Pg and two source registers Zs1, Zs2. The constructive add instruction would be intended to control the apparatus to read the vectors from vector registers Zs1, Zs2, and perform a series of add operations on each respective pair of corresponding data elements of the two vectors to generate corresponding result data elements to be written to the destination register Zd. Any elements identified by predicate register Pg as inactive would have the corresponding data element of the result set to some other value independent of the addition, while the active lanes take the add result of the corresponding data elements of the source vectors.

However, as the constructive add instruction is not available, the programmer or the compiler instead provides a move prefix instruction and a destructive add instruction as shown in the middle part of FIG. 2. The move prefix instruction specifies a destination register Zd and a source register Zs1 and is intended to trigger the processing apparatus to set the move destination register Zd equal to the move source register Zs1. Optionally the move prefix instruction may also specify a predicate register Pg to control which data elements of the destination register Zd are active elements to be populated with corresponding elements from the source register Zs1. However, an unpredicated move prefix instruction may also be provided, in which case the entire source value may be copied from register Zs1 to destination register Zd. The subsequent destructive add instruction specifies the same destination register Zd as the move prefix instruction and the same predicate Pg (if a predicate is provided in the move prefix instruction) and also specifies a second source register Zs2. The add instruction is intended to control the processing hardware to add the respective pairs of elements in registers Zd and Zs2 and write each result to a corresponding element of the destination register Zd, overwriting the previous value in those elements of the destination register. Again, the predicate register controls which lanes are active and inactive, and any inactive lanes are set independently of the addition (e.g. they can be set to zero or to a previous value of the destination register).

The instruction fusing circuitry 50 detects the pair of instructions comprising the move prefix instruction and the destructive add instruction and determines whether or not to fuse them. As shown in the lower part of FIG. 2, the instruction fusing circuitry 50 determines not to fuse these instructions then the unfused move and add instructions are issued to the subsequent stages of the pipeline for execution separately. On the other hand, if the instructions are fused then they are replaced with a fused constructive add instruction as per the original intention of the program or the compiler.

The determination of whether or not to fuse the move prefix instruction with the following instruction may depend on various factors which may include which particular data processing operation is specified by the following instruction. Hence, whether the instructions are fused may vary dynamically for different instances of a move prefix instruction. In the example of FIG. 2 the instruction immediately following the move prefix instruction is an add instruction, but similarly the move prefix instruction could prefix other types of data processing instructions such as other forms of arithmetic instruction (subtract, multiply, divide, square root, multiply add, etc.), or logical instructions (such as AND, OR, XOR, NAND etc.). Hence, there may be a whole class of different kinds of data processing instructions which could be prefixed with a move prefix instruction. When the move prefix instruction is fused with any of a class of data processing instructions, the instruction fusing circuitry 50 may determine from the opcode of the immediately following instruction which of a class of corresponding fused data processing instructions to generated.

In some implementations the fusing circuitry 50 may only fuse the move prefix instruction with the immediately following instruction for certain types of data processing instruction within that class and not all of them. For example, as mentioned above with a floating point instruction there may be a risk that a floating point exception is raised such as when the floating point operation seeks to divide a value by zero, or when the floating point result overflows, underflows or is inexact. To avoid the complexity of dealing with such exception conditions when the fused instruction is executed, an implementation could avoid fusing the move prefix with the immediately following instruction when the operation to be performed is a floating point operation for example.

Also, if the move prefix instruction and following instruction are held in different cache lines or have instruction addresses in different pages of an address space, then the instruction fusing circuitry 50 could choose not to fuse them, because for example the move prefix instruction may be the last instruction of one block of instructions encountered by the decode stage 8 and the following instruction would be the first instruction of the next block, and so these two instructions may not be encountered at the same time. To avoid maintaining state between seeing the two instructions, on encountering the move prefix in the last instruction of one block, the instruction fusing circuitry 50 could determine simply not to fuse it with the next instruction.

However, the decision of whether to fuse or not is independent of several factors, including whether the immediately following instruction is a constructive or destructive instruction, whether the destination registers of the move prefix instruction and the immediately following instruction are the same, whether the predicate registers of the move prefix instruction and the immediately following instruction are the same, and whether one of the source registers of the immediately following instruction is the same as the destination register of the move prefix instruction. The instruction fusing circuitry 50 does not need to check any of these conditions because the fact that the programmer or the compiler has chosen to select the move prefix instruction using the dedicated move prefix encoding (rather than some other kind of instruction capable of moving data values between registers) is an indication that the move prefix instruction is safe to merge with the immediately following data processing instruction. By eliminating the need for checking all these conditions the instruction fusing circuitry 50 can be much more efficient in terms of hardware and so this makes instruction fusion available for simpler pipeline implementations, allowing increased performance for relatively low end systems.

In some implementations, the instruction fusing circuitry 50 may not even check whether the immediately following instruction is actually a data processing instruction. While the programmer or compiler should pair the move prefix instruction with a restricted set of destructive data processing instructions in order to give a predictable result, the instruction fusing circuitry 50 does not need to check whether the immediately following instruction is actually one of that set of destructive data processing instructions, and if the programmer or compiler places the move prefix instruction immediately before a load, store or branch instruction then the instruction fusing circuitry 50 may still fuse the instructions to generate a fused data processing instruction, and the result would be unpredictable. By avoiding the need to check whether the following instruction is one of the allowed set of destructive data processing instructions intended to be fused, the overhead of the instruction fusing circuitry 50 can be reduced. Alternatively, other implementations could check the type of immediately following instruction in order to determine that it is not a load, store, branch or other type of instruction which should not be fused.

Figure 3:
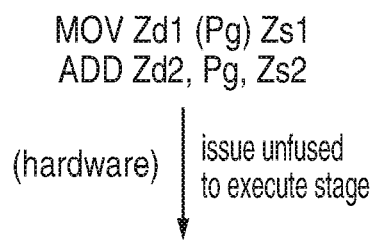
FIG. 3 illustrates use of a non-prefix move instruction.

In contrast to FIG. 2, FIG. 3 shows a sequence of instructions comprising a standard move instruction which is encoded differently from the move prefix instruction shown in FIG. 2. The programmer or the compiler can select the standard move instruction when the subsequent data processing operation is to be independent of the preceding move and so the pair of instructions is not intended to replicate a constructive operation. For a standard move instruction the instruction fusing circuitry 50 may not recognise the move instruction as a candidate for fusion and may simply forward it for processing by subsequent stages of the pipeline separately from the subsequent data processing instruction.

The instruction encoding of the standard move instruction shown in FIG. 3 may be distinguished in any way from the instruction encoding of the move prefix instruction of FIG. 2. It is possible to provide a move instruction with a field which specifies whether it is a standard move instruction or a move prefix instruction. However, in practice the move prefix instruction may have a completely different opcode to the standard (non-prefixing) move instruction. Moving a data value from one register to another can be implemented in practice using other kinds of instructions, such as an OR instruction which performs a logical OR on two identical operands and places the result in a register, an AND instruction which performs a logical AND operation on two identical operands and places the result in a register, an ADD instruction which adds zero to the operand to be moved, or any other instruction which gives the same result as one of its source operands. Therefore, it is often not worth wasting encoding space in the instruction set architecture for a dedicated move instruction, when a move can in fact be implemented using another instruction which is already provided. Therefore, in practice the conventional move instruction shown in FIG. 3 could in fact be another instruction which gives the same result as one of its input operands, and this may have a different opcode to the move prefix instruction shown in FIG. 2.

In some cases when an unfused move prefix instruction is executed, the instruction may be issued to the execute stage 14 and the execute stage 14 may actually write the source value to the destination register. However, if the move prefix instruction is a scalar instruction, an unpredicated vector instruction, or a predicated vector instruction for which the predicate identifies all elements as active, then the move can also be carried out at the rename stage 10 simply by updating the rename table 42 so that the architectural register specifier of the destination register is now mapped to the physical register which was previously mapped to the architectural register specifier of the source register. Hence, some types of register move may not require a slot to be allocated in the issue stage or any action at the execute stage 14, and can simply be implemented through register renaming.

Figure 4:
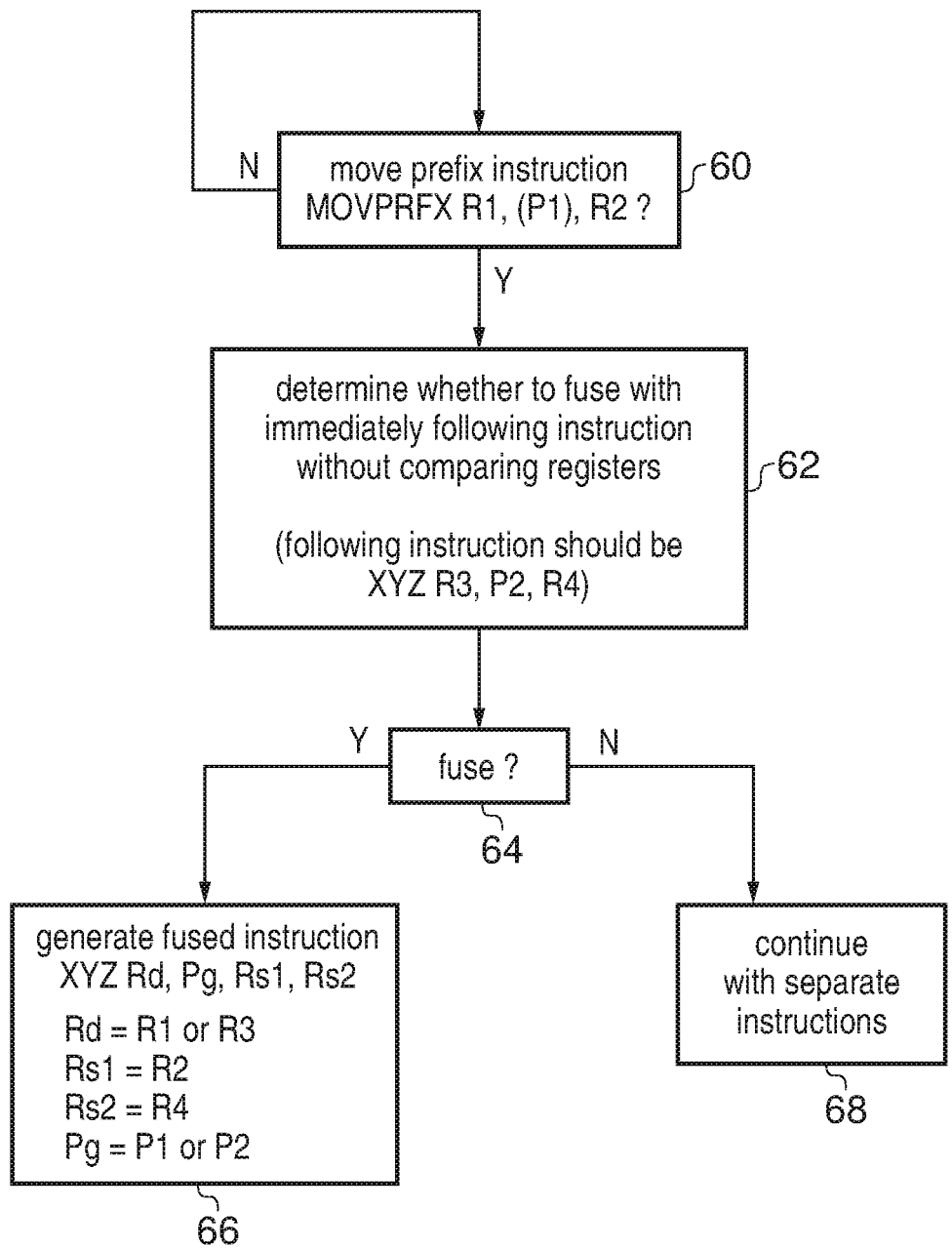
FIG. 4 shows a method of determining whether to fuse instructions.

FIG. 4 shows a method of controlling fusing of instructions. At step 60 the instruction fusing circuitry 50 detects whether the fetched instructions include a move prefix instruction specifying a move destination register R1, a move source register R2 and optionally a predicate register P1. If not, then the fetched instructions are processed in some other way. When a move prefix instruction is detected, then at step 62 the instruction fusing circuitry 50 determines whether to fuse the move prefix instruction with an immediately following instruction independently of whether the destination register R1 of the move prefix instruction is the same as any of the registers specified by the immediately following instruction. The decision to fuse could in some implementations be fixed so that when the move prefix instruction is detected then it is always fused with the immediately following instruction, while in other cases it could depend on other factors such as the particular type of data processing operation to be triggered by the instruction (e.g. whether the operation is a floating point or integer operation, or whether the operation is a divide or add, etc.). The decision could also depend on whether the move prefix instruction and the immediately following instruction are within the same block of instructions being handled at a given time, and are not separated for example by a page boundary or cache line boundary. If used correctly, the immediately following instruction should be one of a class of data processing operations for which the destination register R3 is the same as the move destination register R1, one of the source registers is the destination register R3 itself, and for which the predicate register P2 (if specified) is the same as the predicate register P1 of the move prefix instruction. The immediately following instruction may also specify at least one further source register (e.g. register R4).

At step 64 it is determined whether to fuse the move prefix instruction and the immediately following instruction. If the instructions are fused then at step 66 a fused instruction with a constructive form is generated for passing to subsequent stages for execution. The fused instruction specifies a result register Rd which is equal to either the move destination R1 specified by the move prefix instruction or the destination register R3 specified by the immediately following instruction, a predicate register Pg which is the same as either of the predicate registers P1, P2 specified by the move prefix instruction and the immediately following instruction and at least two operand registers Rs1, Rs2 which equal the move source register R2 of the move prefix instruction and the further source register R4 of the immediately following instruction. Some types of instruction (e.g. multiply-add) may have more than two source operands, in which case more than one source operand of the fused instruction can be the same as the corresponding source registers of the original destructive instruction. On the other hand, if at step 64 it is determined not to fuse the instructions then at step 68 the separate move and processing instructions are processed separately by remaining stages of the pipeline.

The fused instruction shown in FIG. 4 is expected to generate the same result as the combination of two separate move and data processing instructions shown in steps 60 and 62 provided that:

The immediately following instruction is a data processing instruction (and not some other kind of instruction such as a load, store or branch)

The move prefix instruction and the immediately following instruction specify the same destination register (R1=R3)

The immediately following instruction does not use the move prefix destination register (R1) as a further source operand.

The move prefix instruction and the immediately following instruction specify the same predicate register (P1=P2), and The immediately following instruction is a destructive instruction which specifies the same register as both its source and its destination.

It is possible that the programmer or the compiler may misuse the move prefix instruction and place it immediately before an instruction for which any of the following applies: the following instruction is not a destructive data processing instruction using the destination register as a source operand,
the following instruction does not specify the same destination register as the move prefix instruction,
the following instruction uses the move prefix destination register as a further source operand, or
the following instruction does not specify the same predicate register as the move prefix instruction (if the move prefix instruction is a predicated instruction).

As the instruction fusing circuitry 50 is not checking for these conditions, the instruction fusing circuitry 15 may fuse the move prefix instruction and the immediately following instruction to generate a fused instruction which may give a different result to the result that would be generated if the move prefix instruction and the immediately following instruction were executed independently. Hence, if the move prefix instruction is not used correctly by the programmer or compiler, the behaviour of the fused instruction may be unpredictable. The outcome of the fused instruction (or of subsequent instructions using the result of the fused instruction) may depend on the particular way in which a given hardware implementation implements the fusion. For example the fused instruction may operate on a different pair of source registers than was really intended by the combination of the move prefix instruction and the immediately following instruction, or may combine two operations which were never intended to be linked. Hence, if the programmer or the compiler misuses the move prefix instruction then this can cause bugs and incorrect processing results. To ensure correct usage the programmer or the compiler should place the move prefix instruction immediately preceding the destructive data processing instruction to which it applies in the program order, with no intervening instructions, and should ensure that the move prefix instruction and the immediately following instruction specify the same destination register and (if the move prefix instruction is predicated) specify the same predicate register, and that the immediately following instruction is a destructive instruction. The move prefix instruction is effectively a 'promise' that the next instruction will be a suitable destructive instruction to be fused, and if the programmer or the compiler breaks this promise then they cannot expect the results to be correct.

Code written using a move prefix instruction can still be executed by a data processing apparatus which does not have instruction fusing circuitry 50 for fusing instructions. In such implementations the move prefix instruction can simply be treated as a standard move instruction, and executed to move the data value from the move source register Zs1 to the destination register Zd. Hence, the provision of a move prefix instruction in the instruction set architecture does not require that all hardware supporting that architecture must have the instruction fusing circuitry 50, but providing the move prefix instruction enables hardware implementations which do provide instruction fusing circuitry 50 to implement the instruction fusion at lower cost, increasing the likelihood that more hardware implementations will choose to provide fusion.

Figure 5:
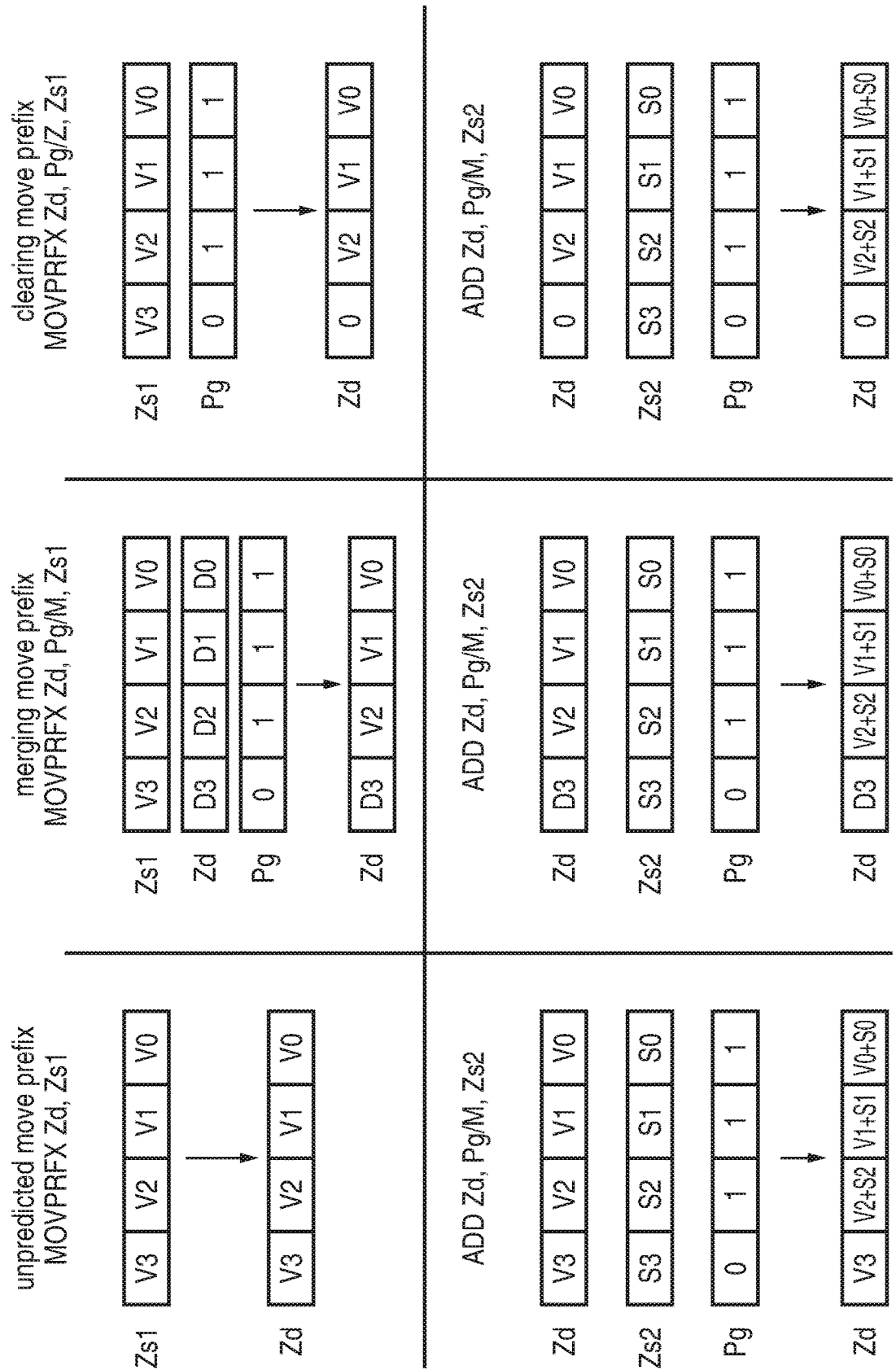
FIG. 5 illustrates three different types of move prefix instruction and their use in conjunction with an immediately following instruction.

As shown in FIG. 5, for vector implementations of the move prefix instruction operating on vector operands comprising multiple data elements, different forms of the move prefix instructions may be provided corresponding to different ways of handling inactive lanes of processing. In this example of FIG. 5, three forms of instruction are provided: an unpredicated move prefix instruction which does not specify a predicate register, i.e. all elements of the vectors are considered active; and two predicated forms of the instruction, namely a merging move prefix instruction for which inactive lanes identified by the predicate value are set to the previous value stored in the corresponding elements of the destination register, and a clearing move prefix instruction for which inactive lanes of the destination register are set to a fixed value (such as 0).

The top part of FIG. 5 shows the result of executing each form of a move prefix instruction as a standalone instruction (without fusion with a subsequent data processing instruction). For the unpredicated move, executing the move instruction unfused results in the entire vector from the source register Zs1 being copied to the destination registers Zd. As mentioned above, in practice this can be achieved simply by updating the rename table 42 so that the architectural specifier for register Zd is now mapped to the physical register previously mapped to source register Zs1.

For the merging move prefix instruction, the active lanes (in this example lanes 0, 1 and 2 for which the predicate value is 1) of the destination register are set equal to the corresponding elements V0, V1, V2 from the source register Zs1, while the inactive lanes (e.g. lane 3 with predicate bit 0) keep the previous value D3 of the destination register Zd. Note that because of register renaming it is possible that even though element D3 remains unchanged between the original destination register and the updated destination register, the result value for the destination register Zd may actually be written to a different physical register to the physical register previously mapped to the destination register Zd and so element D3 may still need to be copied to the destination register alongside the values for the active elements V0, V1, V2.

On the other hand, for the clearing move prefix instruction any inactive elements of the destination register Zd are set to zero, while the active elements take the values of corresponding elements V0-V2 of the source register Zs1.

As shown in the lower part of FIG. 5, when the different types of prefix instruction are followed by a data processing instruction which uses merging predication, then the result is that the active lanes indicated by the predicate Pg of the data processing instruction correspond to the sum of corresponding elements Vn+Sn within the move source register Zs1 and the second source register Zs2 of the data processing instruction. On the other hand, the inactive lanes take different values depending on the type of move prefix instruction which has been combined with the data processing instruction. In the case of the unpredicated move prefix instruction, the inactive lane takes the value V3 from the corresponding element of the move source register Zs1. For the merging move prefix instruction, the result of the following data processing instruction has its inactive lanes populated with an element D3 from the original destination register Zd, and for the clearing move prefix instruction the inactive lanes in the final result will be set to zero. This is the case even though all three examples use exactly the same encoding of the following instruction.

Hence, there is no need to provide different forms of the data processing instruction for different inactive lane handling modes. For example, there is no need to provide an add instruction with an encoding permitting clearing predication, because the preceding move prefix instruction can be selected with a different form to select whether merging or clearing predication is used. This saves encoding space in the data processing instruction. Since the data processing instruction may often have more values to be represented in the instruction encoding than the move prefix instruction, shifting the encoding of the inactive lane handling mode to the move prefix instruction results in a more efficient encoding of the data processing instruction, which leaves more space available in the data processing instruction for encoding other information.

Hence, a destructive data processing instruction (which specifies the same register as both a source register and a destination register) may by default be assumed to use the merging inactive lane handling mode, where inactive lanes keep the corresponding values of the destination register. If a different inactive lane handling mode is desired for the data processing instruction (e.g. zeroing predication), then the behaviour of the data processing instruction can be modified by prefixing the instruction with a different type of move prefix instruction.

While FIG. 5 shows an example of executing the unpredicated move prefix instruction prior to a predicated add instruction, in many examples the unpredicated move prefix instruction would be used in conjunction with an unpredicated data processing instruction which does not have any inactive lanes. In this case, all the lanes may have their result element set to the sum of the corresponding elements Vn, Sn of the registers Zs1, Zs2.

Also, while FIG. 5 shows examples of separately carrying out the move prefix and the add operation, it will be appreciated that when these are fused then the processing circuitry 14 may generate an equivalent result in any way. It is not necessary for the processing circuitry to actually carry out the two operations in sequence and it may be able to generate the appropriate result values directly from the input values of the destination register Zd and the two source register Zs1, Zs2.

One issue which arises when introducing a move prefix instruction as discussed above is how to respond to events which cause execution to be halted. Examples of halting events may be exceptions, interrupts or breakpoints for example. For example, an exception may occur if an instruction generates an abnormal result (e.g. a floating point result is out of range), or an interrupt may be triggered when an external device asserts an interrupt signal, for example indicating that a user has pressed a button on the apparatus or that an external device has transmitted a message. Exceptions or interrupts may lead to the processing circuitry suspending processing and switching to an exception or interrupt handling routine for handling the event that has occurred. When the handling routine is complete, processing may then switch back to the program previously being executed. Similarly, for debugging purposes a breakpoint address may be set, and when processing reaches an instruction whose instruction address matches the breakpoint address, processing may be suspended so that the debugger can carry out some diagnostic action such as inspecting the contents of various registers, reading data values from certain addresses in memory, or other operations to probe the activity of the processing circuitry.

Figure 6:
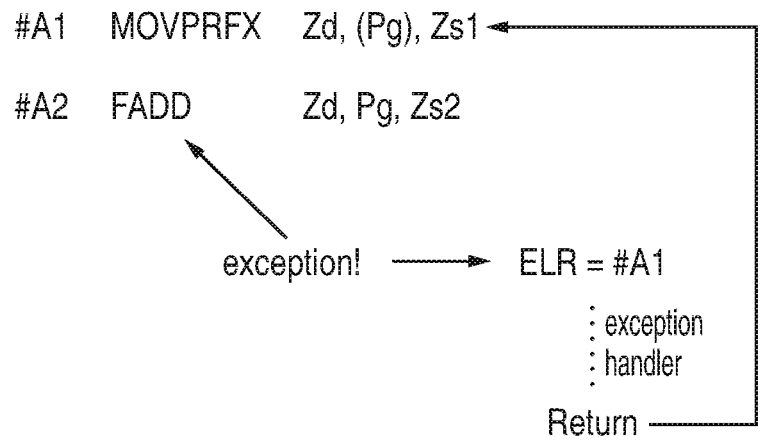
FIGS. 6 and 7 illustrate two different ways of handling an exception or other halting event.
Figure 7:
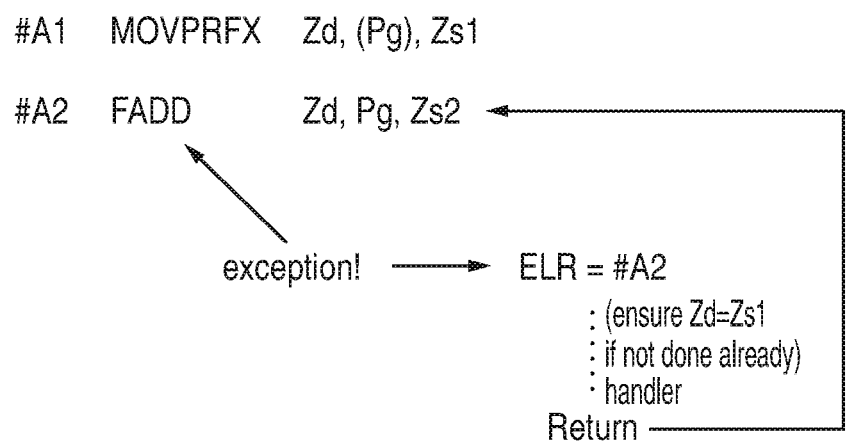

Hence, for all of these types of halting events, on occurrence of the halting event a return address may be recorded to which processing is to return following resolution of the halting event. The return address may be recorded in different ways. For example, the return address could be placed in a register (e.g. a link register), or could be pushed to a stack, or recorded using some other mechanism. As shown in FIGS. 6 and 7, for the pair of the move prefix instruction and the data processing instruction, there are different ways in which the return address value can be determined when a halting event occurs during processing of the following instruction (if unfused) or the fused instruction (if fused).

As shown in FIG. 6, one approach is for a halting event (such as an exception in this case) to trigger recording in a register (ELR) the return address # A1 of the move prefix instruction, even if the exception was actually triggered by the following instruction. In the example of FIG. 6, the data processing instruction is a floating point instruction FADD and so the exception may be a floating point exception. Hence, once the exception handler has completed to resolve the exception condition, the processing returns to address # A1 of the move prefix instruction, and so the instruction fusing circuitry 50 can decide again whether to fuse the move prefix instruction with the following instruction. This approach avoids need for any state to be maintained prior to resuming the following instruction, because the move prefix instruction can be repeated even if its effects had already been architecturally performed prior to the halting event.

On the other hand, as shown in FIG. 7 another approach may be for the halting event to trigger recording in the ELR the return address # A2 of the following instruction, instead of the address of the move prefix instruction. In this case, in addition to setting the return address, the processing circuitry may ensure that the destination register Zd of the move prefix instructions is set to the same result it would have if the move prefix instruction had been executed. In practice, in some cases if the move prefix instruction was not fused with the following instruction, the move prefix instruction may already have been executed and so the destination register Zd may already have the correct result. On the other hand, if the move prefix instruction has not already been executed, or the move prefix instruction had been fused with the following instruction, then on encountering the exception an operation may be carried out to set the destination register Zd to the correct value so that when processing later returns to address # A2 then the following instruction FADD can be executed as if the move prefix instruction has already completed. For example, it can be assured that the move prefix instruction has architecturally completed by either repeating the move prefix instruction, or if the move prefix instruction is unpredicated, simply updating the rename table 42 so that the architectural destination register Zd now maps to the physical register now previously mapped to the source architectural registers Zs1.

Some systems may permanently operate according to the approach shown in FIG. 6 or the approach shown in FIG. 7. However, it can be useful to provide the flexibility for the processing circuitry to record the return address as either the address # A1 of the move prefix instruction or the address # A2 of the data processing instruction, depending on current conditions when the halting event is encountered. For example, the return address value may depend on whether the move prefix instruction and the following instruction were fused the first time they were encountered. If the instruction fusing circuitry 50 fused these instructions, then it can be assumed that a move had not yet been completed and so an exception, interrupt, or breakpoint occurring for the fused instruction may lead to the return address being set to the address # A1 of the move prefix instruction as shown in FIG. 6. This ensures that when processing resumes following resolution of the halting event then the move will effectively be carried out by (either explicitly using the unfused move instruction or implicitly in the generation of the result of the fused instruction).

On the other hand, if the pair of instructions were executed unfused the first time, then by the time the halting event is detected, the move of the move prefix instruction may already have completed and so the approach shown in FIG. 7 may be more appropriate to avoid unnecessarily repeating the move instruction. Hence, by providing the ability to select between addresses A1 and A2 when setting the return address, processing performance can be improved since repeating the move prefix instruction as shown in FIG. 6 is only required when the move had not already been carried out.

In summary, by providing a move prefix instruction signalling that fusion is possible with an immediately following instruction, the program or compiler can hint to the processing circuitry that it is safe to fuse without needing the instruction fusing circuitry to determine whether registers of the pair of instructions match, which greatly reduces the overhead of fusion. If the program or compiler has used the instruction correctly then the immediately following instruction is expected to be a destructive data processing instruction with a single register specifier identifying both the destination register and the first source register, and the destination register of the move prefix instruction being the same as the destination register of the following instruction. In this case the fusing circuitry can fuse these instructions to form a constructive data processing instruction which separately identifies two operand registers and a result register.

In particular, the constructive instruction may be formed with its registers specified as follows: the result register of the constructive instruction may correspond to either the move destination register of the move prefix instruction or the destination register of the immediately following instruction, and the at least two operand registers of the constructive instruction may be set corresponding to the move source register of the move prefix instruction and one of the source registers of the immediately following data processing instruction. With this approach the fused instruction will have the same result as separately executing the two move prefix and data processing instructions, provided that the programmer or compiler ensures that the immediately following instruction is a destructive data processing instruction specifying the same destination register as the move prefix instruction. If vector predicates are used, the predicate of the fused instruction may be set equal to the predicate of either of the move prefix and immediately following instructions (which should be the same if the programmer/compiler has used the instructions correctly).

In addition to the move prefix instruction there may be at least one other type of instruction which can control the processing circuitry to copy a data value from a first register to a second register. For example the other instruction could be an AND instruction, OR instruction, ADD instruction, or a dedicated MOV instruction as mentioned above, or any other kind of instruction which gives a result which is equal to one of the source operands. Hence, there will typically be many instructions in the architecture which can already achieve a register move. The move prefix instruction is provided in addition to such instructions, with a different instruction encoding. It may seem surprising that it is useful to provide a dedicated instruction to provide the register move functionality which can already be provided by other instructions. However, by providing the different instruction encoding for the move prefix instruction, this allows the programmer or compiler to signal when they intend the move to precede a following destructive instruction to form a fused constructive instruction as opposed to an independent move operation. Hence this obviates the need for the processing circuitry to check that various conditions required for fusion are met.

The move prefix instruction could be specific to a specific type of data processing instruction, such as an add. However, it can be useful to couple the move prefix instruction with any of a class of data processing instructions corresponding to different processing operations, so that regardless of which particular operation is represented by the immediately following instruction, in general the move prefix can be fused with a destructive instruction to form a fused constructive instruction corresponding to the same processing operation as the original destructive instruction. For example the class of data processing instructions could include various operations including add, subtract, multiply, divide, multiply add, square root, shift, AND, OR, NOT, NAND, NOR, XOR as well as various floating point operations and other vector operations such as interleave etc.

The decision whether to fuse the move prefix instruction with the immediately following instruction could be static for some implementations. Hence, when the move prefix instruction is detected, some implementations could always merge it with the immediately following instruction regardless of any other condition.

However, other systems may dynamically determine whether to fuse the instructions dependent on at least one criterion other than the register comparison between the move prefix instruction and the immediately following instruction. For example, these other criteria could include which type of processing operation is to be carried out by the immediately following instruction, whether the move prefix instruction and the immediately following instruction are held in different cache lines, and whether they correspond to the different pages of an address space.

The examples above have discussed a vector processing system which supports vector processing using operands comprising multiple data elements. However, a similar move prefix instruction could be introduced to a scalar processing system which processes scalar data values corresponding to a single data element. In this case, the predicate value would not be provided and the different inactive lane handling modes of FIG. 5 would not be provided. Otherwise the scalar move prefix instruction can precede a scalar data processing instruction in the same way as the vector embodiments as discussed above.

As mentioned above, when vector operands are processed, the move prefix instruction can be very useful because, as well as signalling when fusion is possible, different forms of the move prefix instruction can be provided corresponding to different inactive lane handling modes, to enable the operation of the following operation to be modified without changing the encoding of the following instruction in any way. This saves encoding space in the instruction set architecture because it is not necessary to provide different versions of the data processing instruction corresponding to different forms of predication.

The above embodiments discuss fusion of a move prefix instruction with an immediately following instruction. The pair of instructions can also be viewed as a single double-length instruction in the fetched instructions, which can then be either split into separate instructions or forwarded as a single combined instruction to be processed by the processing circuitry. This is entirely equivalent to the fusion approach discussed above (the actual operations performed by the instruction fusing circuitry would be the same, the only difference being one of interpretation as to whether the original instructions are viewed as one or two instructions). Hence, in some implementations the instruction fusing circuitry's determination of whether to fuse instructions may effectively be a determination of whether or not to split a double-length instruction (independently of any register comparison between the two parts of the double-length instruction), and the claims encompass this approach.

Figure 8:
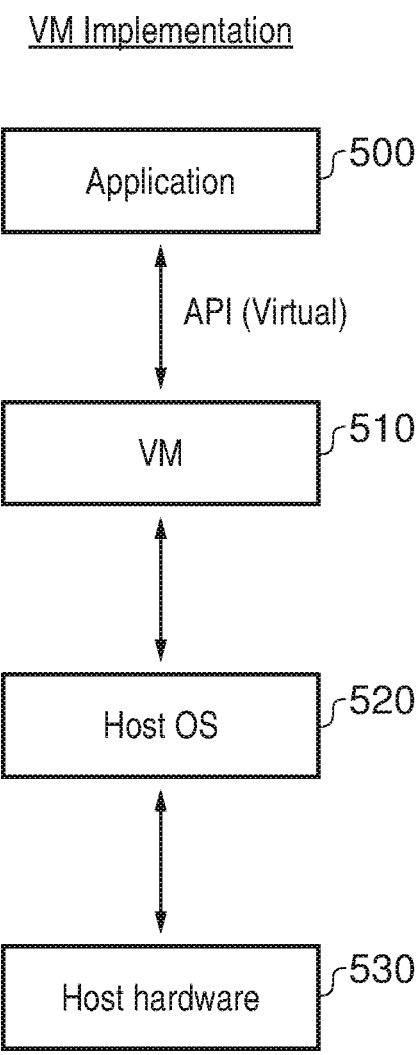
FIG. 8 illustrates a virtual machine implementation.

FIG. 8 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to perform data processing in response to instructions; and
instruction fusing circuitry to fuse a move prefix instruction and an immediately following instruction fetched from a data store to generate a fused data processing instruction to be processed by the processing circuitry;
wherein:
the move prefix instruction identifies a move destination register and a move source register specifying a data value to be at least partially copied to the move destination register;
in response to detecting said move prefix instruction, the instruction fusing circuitry is configured to determine whether to fuse said move prefix instruction and said immediately following instruction independently of whether the move destination register of the move prefix instruction is the same register as any register specified by said immediately following instruction;
the move prefix instruction indicates that the immediately following instruction is expected to be a destructive data processing instruction for which a destination register is to be set to a result value corresponding to a result of applying a predetermined processing operation to at least two source values specified by at least two source registers, and for which the destination register and one of said at least two source registers are the same as the move destination register of the move prefix instruction; and
when the destination register of the immediately following instruction is not the same as the move destination register of the move prefix instruction, the fused data processing instruction generated by fusing the move prefix instruction and the immediately following instruction is capable of providing a different result from a result that would be generated if the move prefix instruction and the immediately following instruction were executed independently.

2. The apparatus according to claim 1, wherein the destructive data processing instruction has an instruction encoding comprising a single register specifier identifying both the destination register and said one of said at least two source registers.

3. The apparatus according to claim 1, wherein the fused data processing instruction comprises a constructive data processing instruction separately identifying at least two operand registers and a result register to be set to a result value corresponding to a result of applying a processing operation to values specified by said at least two operand registers.

4. The apparatus according to claim 3, wherein the instruction fusing circuitry is configured to generate said constructive data processing instruction with:
   said result register corresponding to one of said move destination register of the move prefix instruction and a destination register of the immediately following instruction; and
   said at least two operand registers corresponding to said move source register of said move prefix instruction and at least one source register of the immediately following instruction.

5. The apparatus according to claim 1, wherein the move prefix instruction has a different instruction encoding to at least one other type of instruction for controlling the processing circuitry to copy a data value from a first register to a second register.

6. The apparatus according to claim 1, wherein the instruction fusing circuitry is configured to fuse the move prefix instruction and the immediately following data processing instruction when the immediately following data processing instruction is any of a class of data processing instructions corresponding to different types of processing operations to be performed.

7. The apparatus according to claim 1, wherein in response to detecting said move prefix instruction, the instruction fusing circuitry is configured to determine whether to fuse said move prefix instruction and said immediately following instruction in dependence on at least one criterion other than whether the move destination register of the move prefix instruction is the same register as any register specified by said immediately following data processing instruction.

8. The apparatus according to claim 7, wherein said at least one criterion comprises at least one of:
   when the immediately following instruction is a data processing instruction for controlling the processing circuitry to perform a given processing operation on at least two source values, which type of processing operation is the given processing operation for said immediately following instruction;
   whether said move prefix instruction and said immediately following instruction are held in different cache lines; and
   whether said move prefix instruction and said immediately following instruction correspond to different pages of an address space.

9. The apparatus according to claim 1, wherein the move prefix instruction and the immediately following instruction comprise scalar instructions for processing scalar data values comprising a single data element.

10. The apparatus according to claim 1, wherein the move prefix instruction and the immediately following instruction comprise vector instructions for processing vector data values comprising a plurality of data elements.

11. The apparatus according to claim 10, wherein when the immediately following instruction is a data processing instruction for controlling the processing circuitry to perform a given processing operation on at least two source values to generate a result value, the immediately following instruction identifies a predicate value indicating which data elements of the result value are active elements to be set to a value dependent on corresponding data elements of the at least two source values or inactive elements to be set to a value independent of the at least two source values.

12. The apparatus according to claim 11, wherein the instruction fusing circuitry is configured to determine whether to fuse the move prefix instruction and the immediately following instruction independently of whether the move prefix instruction identifies a same predicate value as the immediately following data processing instruction.

13. The apparatus according to claim 11, wherein the move prefix instruction comprises one of a plurality of types of move prefix instruction; and
   when the instruction fusing circuitry fuses the move prefix instruction with the immediately following instruction, the instruction fusing circuitry is configured to generate the fused data processing instruction to control the processing circuitry to determine the inactive elements of the result value according to an inactive lane handling mode selected in dependence on which type of move prefix instruction was fused with the immediately following instruction.

14. The apparatus according to claim 13, wherein the instruction fusing circuitry is configured to generate the fused data processing instruction to control the processing circuitry to determine the inactive elements of the result value with said inactive lane handling mode selected independently of an encoding of the immediately following instruction.

15. The apparatus according to claim 13, wherein when the move prefix instruction is an unpredicated type of move prefix instruction, the instruction fusing circuitry is configured to generate the fused data processing instruction to control the processing circuitry to determine the inactive elements of the result value with values of corresponding elements of the move source register.

16. The apparatus according to claim 15, wherein when the move prefix instruction is the unpredicated type of move prefix instruction and the instruction fusing circuitry determines not to fuse the move prefix instruction with the immediately following instruction, the processing circuitry is responsive to the move prefix instruction to copy the entire data value from the move source register to the move destination register.

17. The apparatus according to claim 13, wherein when the move prefix instruction is a merging type of move prefix instruction, the instruction fusing circuitry is configured to generate the fused data processing instruction to control the processing circuitry to determine the inactive elements of the result value with values dependent on previous values of corresponding elements of the move destination register.

18. The apparatus according to claim 17, wherein the merging type of move prefix instruction specifies a move predicate value identifying which elements of the move destination register are active elements or inactive elements; and
   when the move prefix instruction is the merging type of move prefix instruction and the instruction fusing circuitry determines not to fuse the move prefix instruction with the immediately following instruction, the processing circuitry is responsive to the move prefix instruction to set active elements of the move destination register to values of corresponding elements of the move source register and to retain the previous values for inactive elements of the move destination register.

19. The apparatus according to claim 13, wherein when the move prefix instruction is a clearing type of move prefix instruction, the instruction fusing circuitry is configured to generate the fused data processing instruction to control the processing circuitry to determine the inactive elements of the result value with values cleared to a predetermined value.

20. The apparatus according to claim 19, wherein the clearing type of move prefix instruction specifies a move predicate value identifying which elements of the move destination register are active elements or inactive elements; and
  when the move prefix instruction is the clearing type of move prefix instruction and the instruction fusing circuitry determines not to fuse the move prefix instruction with the immediately following instruction, the processing circuitry is responsive to the move prefix instruction to set active elements of the move destination register to values of corresponding elements of the move source register and to clear inactive elements of the move destination register to the predetermined value.

21. The apparatus according to claim 11, wherein the processing circuitry is responsive to an unfused data processing instruction identifying a same register as both a destination register and a source register to generate a result value with inactive elements set to values depending on previous values of corresponding elements of said same register.

22. The apparatus according to claim 1, wherein in response to a halting event triggered by said immediately following instruction or said fused data processing instruction, the processing circuitry is configured to record, as a return address for resuming processing following resolution of the halting event, an address of said move prefix instruction.

23. The apparatus according to claim 1, wherein in response to a halting event triggered by said immediately following instruction or said fused data processing instruction, the processing circuitry is configured to record, as a return address for resuming processing following resolution of the halting event to, an address of said immediately following instruction and ensure that data of the move destination register is equivalent to a result of executing the move prefix instruction.

24. The apparatus according to claim 1, wherein in response to a halting event triggered by said immediately following instruction or said fused data processing instruction, the processing circuitry is configured to select whether to record, as a return address for resuming processing following resolution of the halting event, an address of the move prefix instruction or an address of the immediately following instruction in dependence on whether the instruction fusing circuitry fused the move prefix instruction and the immediately following instruction.

25. The apparatus according to claim 24, wherein when the instruction fusing circuitry fused the move prefix instruction and the immediately following instruction, the processing circuitry is configured to record the address of the move prefix instruction as the return address, and when the instruction fusing circuitry did not fuse the move prefix instruction and the immediately following instruction the processing circuitry is configured to record the address of the immediately following instruction as the return address.

26. The apparatus according to claim 22, wherein the halting event comprises one of:
  an exception event;
  an interrupt; and
  a breakpoint.

27. A data processing method comprising:
detecting, among instructions fetched from a data store for processing by processing circuitry, a move prefix instruction identifying a move destination register and a move source register specifying a data value to be at least partially copied to the move destination register; and
determining whether to fuse the move prefix instruction with an immediately following instruction to generate a fused data processing instruction to be processed by the processing circuitry;
wherein:
when the move prefix instruction is detected, the determining step determines whether to fuse said move prefix instruction and said immediately following instruction independently of whether the move destination register of the move prefix instruction is the same register as any register specified by said immediately following instruction;
the move prefix instruction indicates that the immediately following instruction is expected to be a destructive data processing instruction for which a destination register is to be set to a result value corresponding to a result of applying a predetermined processing operation to at least two source values specified by at least two source registers, and for which the destination register and one of said at least two source registers are the same as the move destination register of the move prefix instruction; and
when the destination register of the immediately following instruction is not the same as the move destination register of the move prefix instruction, the fused data processing instruction generated by fusing the move prefix instruction and the immediately following instruction is capable of providing a different result from a result that would be generated if the move prefix instruction and the immediately following instruction were executed independently.

28. An apparatus comprising:
means for performing data processing in response to instructions; and
means for fusing a move prefix instruction and an immediately following instruction fetched from a data store to generate a fused data processing instruction to be processed by the processing circuitry;
wherein:
the move prefix instruction identifies a move destination register and a move source register specifying a data value to be at least partially copied to the move destination register; and
in response to detecting said move prefix instruction, the means for fusing is configured to determine whether to fuse said move prefix instruction and said immediately following instruction independently of whether the move destination register of the move prefix instruction is the same register as any register specified by said immediately following instruction;
the move prefix instruction indicates that the immediately following instruction is expected to be a destructive data processing instruction for which a destination register is to be set to a result value corresponding to a result of applying a predetermined processing operation to at least two source values specified by at least two source registers, and for which the destination register and one of said at least two source registers are the same as the move destination register of the move prefix instruction; and when the destination register of the immediately following instruction is not the same as the move destination register of the move prefix instruction, the fused data processing instruction generated by fusing the move prefix instruction and the immediately following instruction is capable of providing a different result from a result that would be generated if the move prefix instruction and the immediately following instruction were executed independently.

29. A computer program stored on a computer readable storage medium that, when executed by a data processing apparatus, provides a virtual machine which provides an instruction execution environment corresponding to the apparatus of claim 1.

* * * * *